Figure 1:
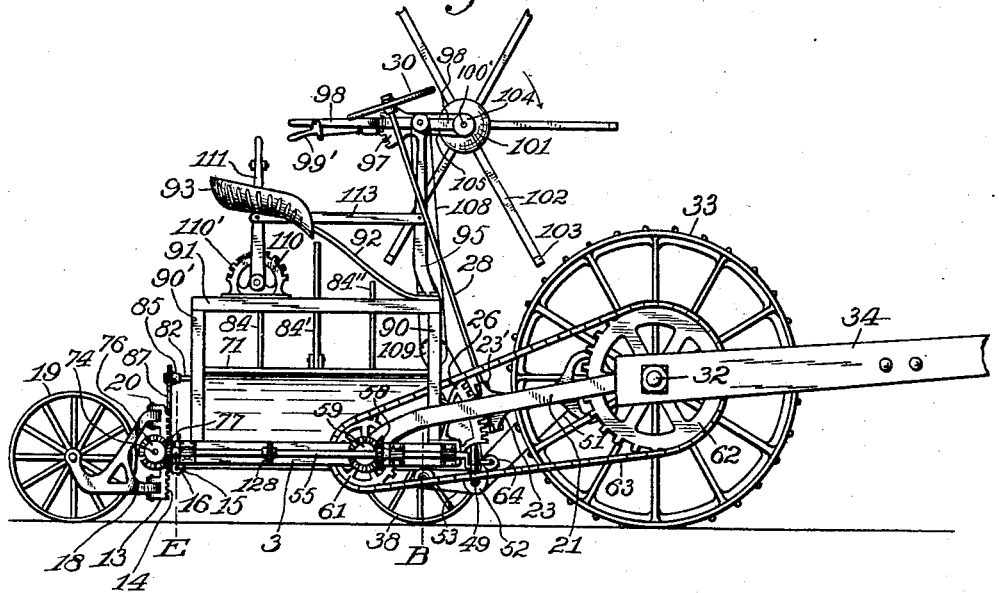

V. McLAUGHLIN.
REAPER.
APPLICATION FILED FEB. 25, 1909.

968,878.

Patented Aug. 30, 1910.

4 SHEETS—SHEET 1.

WITNESSES:
J. H. Gardner.
K. R. Woddell.

INVENTOR:
Vora McLaughlin,
BY E. T. Silvius,
ATTORNEY.

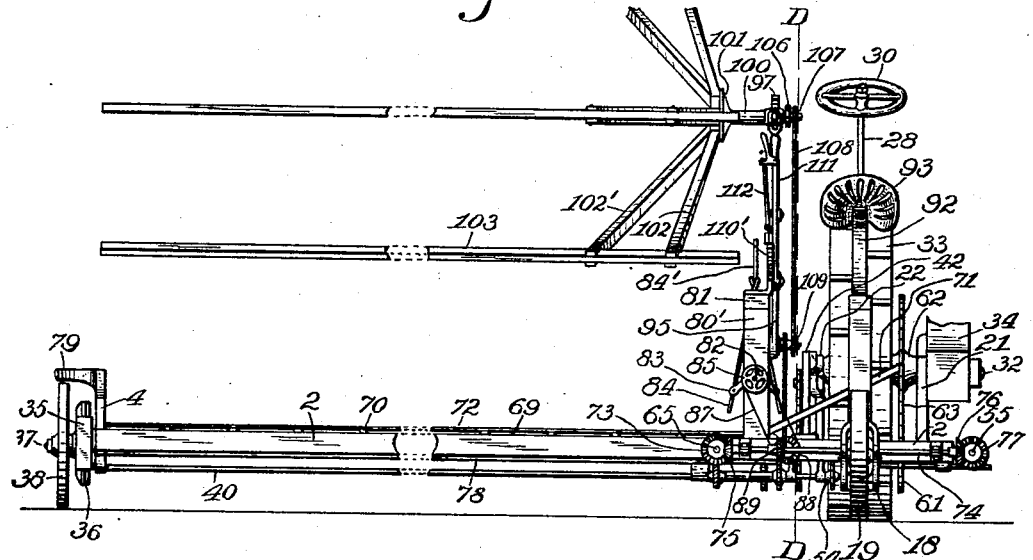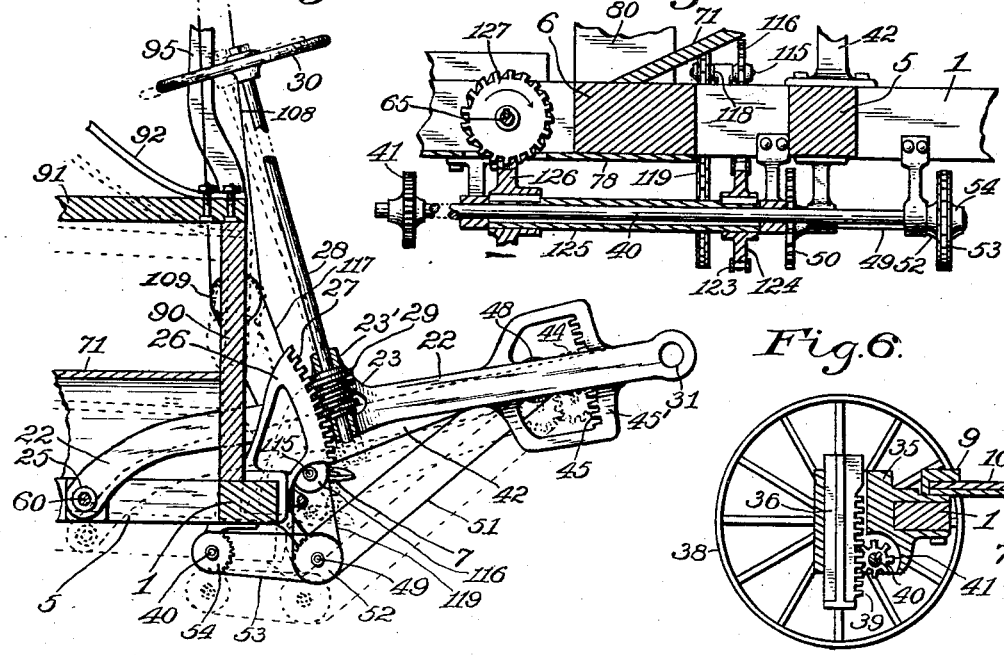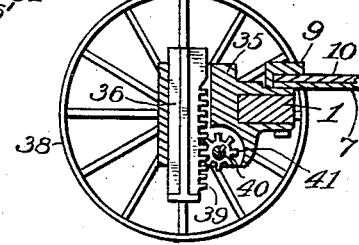

V. McLAUGHLIN.
REAPER.
APPLICATION FILED FEB. 25, 1909.
968,878.
Patented Aug. 30, 1910.
4 SHEETS—SHEET 3.
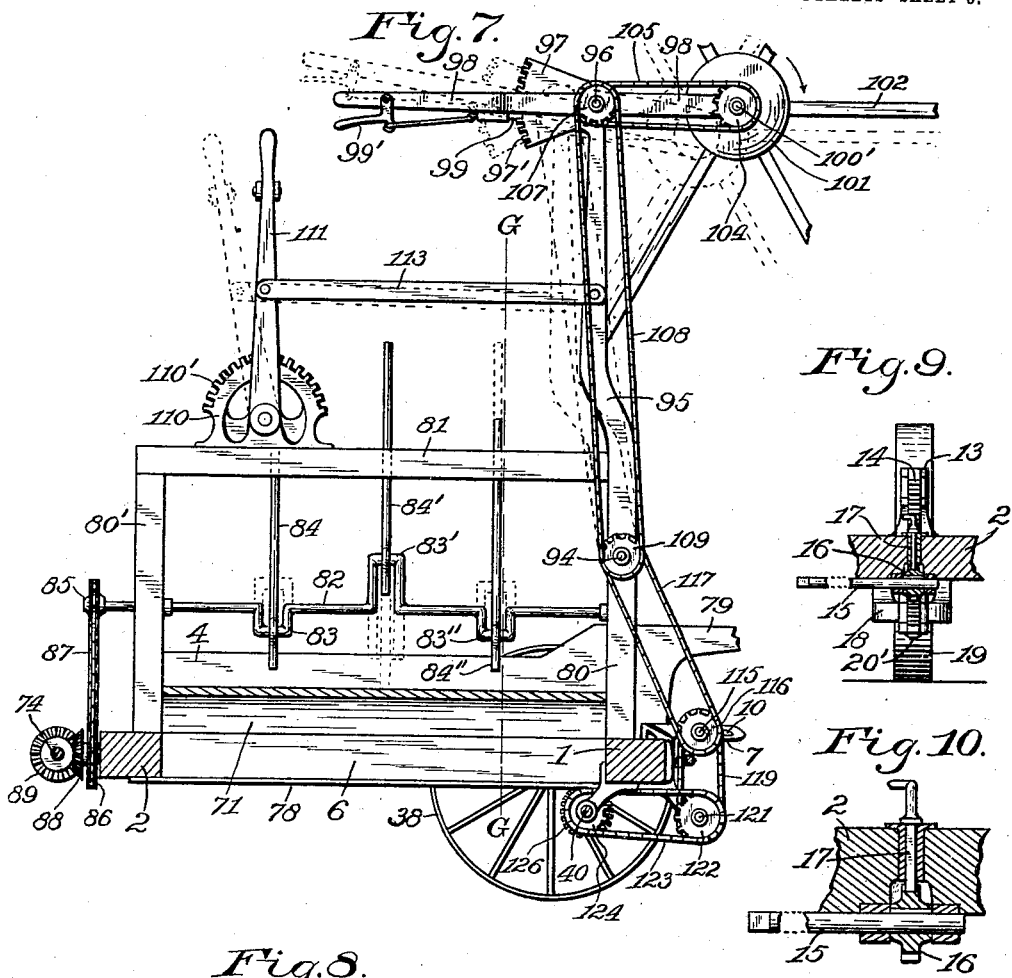
WITNESSES:
J. H. Gardner
K. R. Woddell.
INVENTOR:
Vora McLaughlin,
BY
E. T. Silvius,
ATTORNEY.

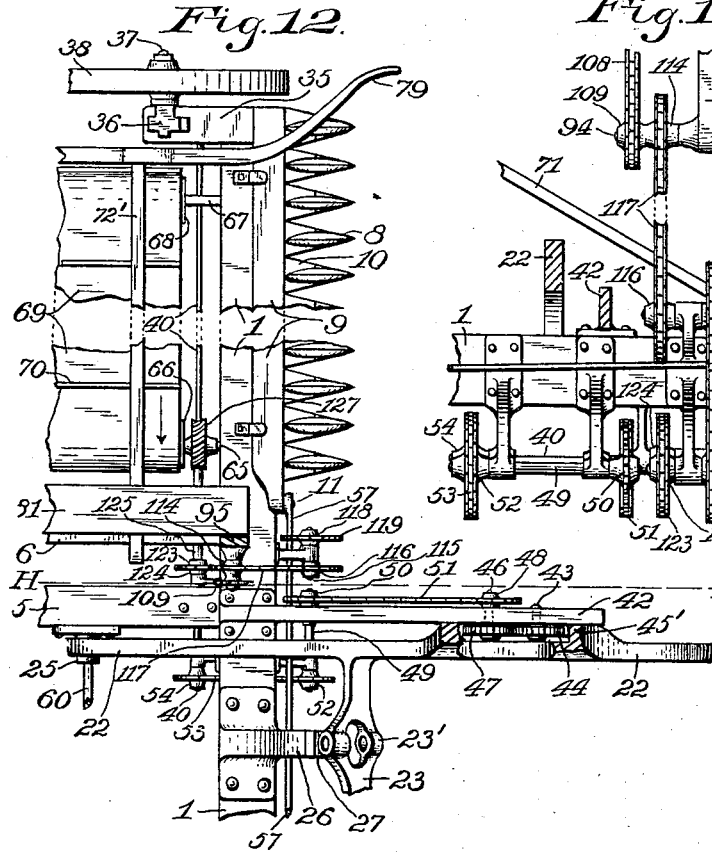
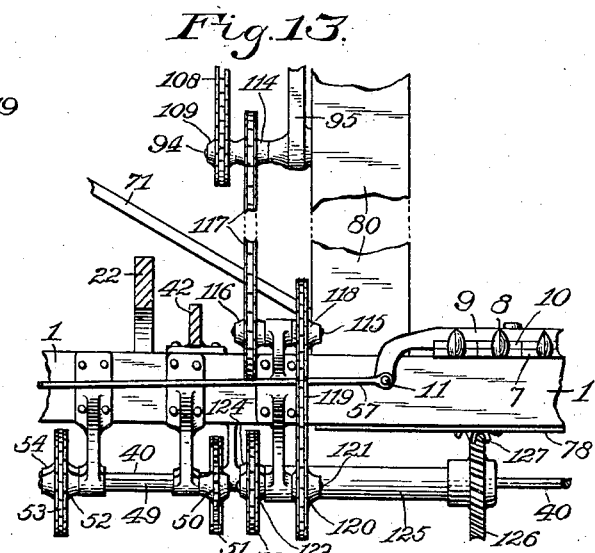
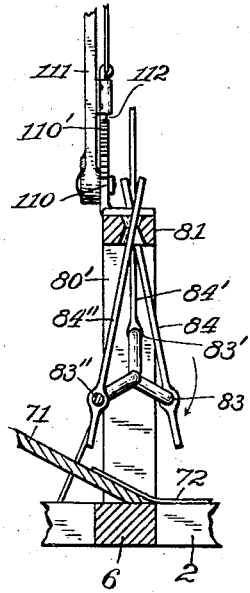
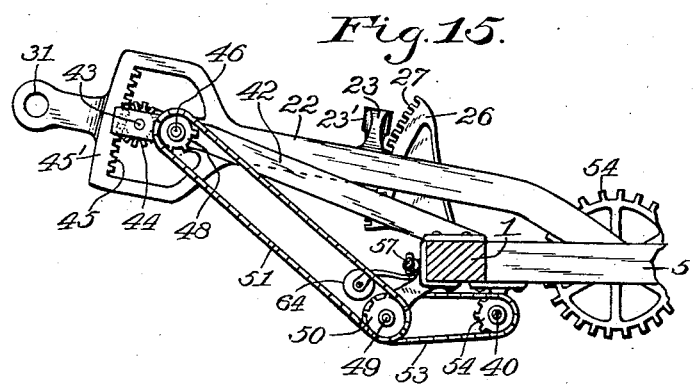

UNITED STATES PATENT OFFICE.

VORA McLAUGHLIN, OF WALNUT TOWNSHIP, MONTGOMERY COUNTY, INDIANA.

REAPER.

968,878.  Specification of Letters Patent. Patented Aug. 30, 1910.

Application filed February 25, 1909. Serial No. 479,987.

*To all whom it may concern:*

Be it known that I, VORA MCLAUGHLIN, a citizen of the United States, residing in Walnut township, in the county of Montgomery and State of Indiana, have invented certain new and useful Improvements in Reapers; and I do declare the following to be a full, clear, and exact description of the invention, reference being had to the accompanying drawings, and to the letters and figures of reference marked thereon, which form a part of this specification.

This invention relates to agricultural machinery of the horse power type of reapers that are adapted to carry self-binders, the invention having reference particularly to a reaper for cutting grain, of improved construction, whereby the draft horses are relieved of the burden of carrying heavy portions of the machine frame, the invention having reference also to the construction of the reaper frame in general.

The principal object of the invention is to provide an improved reaper of such construction as to be adapted to be carried entirely on wheels so that the work of the draft animals will consist only in drawing the machine and through it furnish power for the operation thereof, it being known that heretofore reapers have been so constructed that the draft animals must support a large amount of the weight of the machine, which is a severe tax on the strength of the animals, being in addition to that required in drawing the machine.

Another object is to provide an improved reaper frame that will be adapted to be adjusted to different heights, so as to raise or lower the cutting apparatus promptly and conveniently while the machine is in operation.

A further object is to provide an improved reaper which, while adapted to be manufactured at relatively small cost, will be efficient, durable and economical in use.

With the above-mentioned and other objects in view the invention consists in a reaper comprising a knuckle-jointed frame, the main part of the frame being carried on a plurality of wheels, and the other part that is relatively adjustable being carried on a main or drive wheel, and the pole or tongue of the machine being mounted on the axle of the main or drive-wheel, the cutting apparatus being mounted on the main part of the frame, said reaper comprising gearing for controlling and operating the knuckle-jointed parts of the frame.

The invention comprises also novel parts, and combinations and arrangements of parts, as hereinafter particularly described and afterward pointed out in the accompanying claims.

Figure 2:
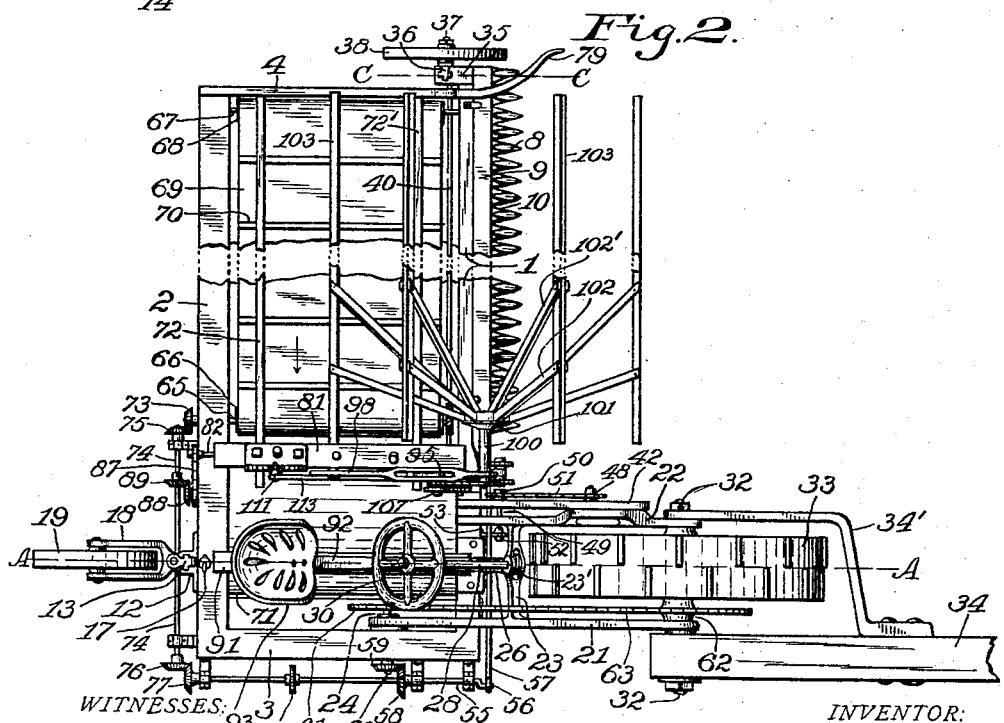

Referring to the drawings, Figure 1 is a side elevation of the improved reaper; Fig. 2, a top plan of the machine partially broken away; Fig. 3, a rear elevation of the machine partially broken away; Fig. 4, a fragmentary vertical sectional view approximately on the line A A in Fig. 2; Fig. 5, a fragmentary vertical sectional view approximately on the line B in Fig. 1; Fig. 6, a fragmentary vertical sectional view approximately on the line C C in Fig. 2; Fig. 7, a vertical sectional view approximately on the line D D in Fig. 3; Fig. 8, a fragmentary vertical sectional view on the line A A in Fig. 2; Fig. 9, a fragmentary vertical sectional view approximately on the line E in Fig. 1; Fig. 10, a fragmentary reproduction of parts shown in Fig. 9 on an enlarged scale; Fig. 11, a fragmentary horizontal sectional view on the line F F in Fig. 8; Fig. 12, a fragmentary top plan of the main portions of the machine with the upright parts broken away; Fig. 13, a fragmentary front elevation with parts in section at the plane forward of the cutting apparatus; Fig. 14, a fragmentary sectional view on the line G G in Fig. 7; and Fig. 15, a fragmentary vertical sectional elevation on the line H H in Fig. 12.

Similar reference characters throughout the various figures of the drawings indicate corresponding elements or features of construction referred to herein.

In attaining the objects of the invention a main or drive-wheel and a trailing wheel are employed for supporting the heavier portion of the machine frame that carries the operating gearing of the machine, and a side carrying wheel is employed for supporting the outer end of the knife bar or sickle bar and its supporting frame. Provision is made for adjusting the height of the cutting apparatus expeditiously, and the guiding pole or tongue is mounted on the axle of the main or driving wheel, so as to be capable of moving pivotally upward or downward, so that the draft animals when hitched to the pole for drawing the machine will support only the free end of the pole, The construction of the machine may be varied in detail.

The preferred construction of the improved reaper comprises a main frame part which may suitably be formed of forward and rear members 1 and 2 respectively, and side members 3 and 4 attached to the ends of the forward and rear members, and also intermediate members 5 and 6 attached to the forward and rear members at suitable distances from the member 3. The main frame part may comprise also such other members as may be desired, and the various parts may be constructed of any suitable material. A suitable finger-bar 7 is mounted on the member 1 in any suitable manner so that it may be carried at a desirable distance above the ground, the finger-bar having fingers 8 thereon projecting forward as usual, and a knife-bar or sickle bar 9 having cutting knives 10 is mounted so as to move longitudinally in coöperation with the finger-bar, the inner end of the knife-bar being provided with a wrist-pin 11.

A frame member which constitutes a vertical guide 12 is secured to the rear member 2 of the frame at a suitable distance from the member 3 and has a pivot head 13 mounted therein, so as to be movable vertically, the pivot head having gear teeth 14 thereon. A short shaft 15 is suitably mounted rotatively on the frame member 2 and has a toothed wheel 16 secured thereto that engages the gear-teeth 14 for holding the pivot-head and for adjusting the pivot head vertically with respect to the frame, a lock-bolt 17 being mounted movably in the frame to normally engage the teeth of the toothed wheel to lock it against rotative movements, the lock-bolt being adapted to be withdrawn so that the toothed wheel may rotate, and the shaft 15 may be engaged by a suitable wrench for turning it by hand. A wheel frame 18 is connected to the pivot head by vertical pivots 20 and 20' and has a trailing wheel 19 mounted rotatably therein so that the wheel supports the rear portion of the main frame.

For mainly supporting the forward portion of the main frame part so as to be adjustable vertically a relatively adjustable supplemental frame part is pivoted or hinged to the main frame part and comprises two arms 21 and 22 connected together by a rigid cross-beam 23 having journal bearings 23', the rearward ends of the arms being pivoted on the exterior of journal boxes 24 and 25 mounted on the frame members 3 and 5 respectively, so that the opposite or forward ends of the arms may swing upward or downward relatively to the main frame part. A curved rack bar 26 having gear teeth 27 is secured to the frame member 1, and an operating shaft 28 is mounted in the journal bearings 23' and extends upward a suitable distance, the shaft having a worm 29 secured thereto that engages the teeth 27 so as to lock the arms with respect to the main frame part and adapted to move the arms adjustably, the upper end of the shaft having a hand-wheel 30 secured thereto to be used by the driver of the machine. The forward ends of the arms 21 and 22 have each a circular aperture 31 therein through which the axle 32 of the main or driving wheel 33 extends, the wheel being suitably mounted on the axle between the arms so as to be rotatable. The wheel is of suitable diameter to afford the required tractive force for driving the mechanism of the machine. The guiding pole or tongue 34 has its rear end suitably mounted on and supported by the axle 32 at the outer side of the arm 21, the pole having a brace 34' attached thereto and extending to the opposite side of the wheel and connected to the axle thereof adjacent to the arm 22. The pole may otherwise be formed in any desired manner and any suitable provision may be made for hitching the draft animals to the pole, as will be understood.

A frame member is attached to the main frame part at the end of the member 1 most remote from the arms 21 and 22 and constitutes a vertical guide 35 in which an axle head 36 is mounted so as to be adjustable to support the side of the frame at various heights, the axle-head having an axle 37 thereon on which a carrying-wheel 38 is mounted. The axle-head has gear teeth 39 thereon for locking it with respect to the guide. A shaft 40 is mounted rotatably on the main frame part and extends from the guide 35 in proximity to the member 1 a suitable distance toward the member 3 of the frame, the shaft having a toothed wheel 41 thereon in contact with several of the teeth 39 so that when the shaft is rotated the frame part may be raised or lowered, as may be required, or may be held against vertical movement if the shaft be prevented from rotating. In order to rotate the shaft so as to readjust the end of the finger-bar that is in proximity to the wheel 38 when the main portion of the main frame part is readjusted by means of the wheel 30, an arm 42 is secured to the frame member 1 and extends forward adjacent to the arm 22, the end portion of the arm 42 carrying an axle 43 on which is rotatably mounted a pinion 44 that coöperates with gear teeth 45 formed on a curved bar 45' on the arm 22; the arm 42 having also a shaft 46 mounted rotatably near the axle 43, and a pinion 47 is secured to the shaft 46 and engages the pinion 44. A sprocket wheel 48 is secured to the shaft 46 and receives motion when the end of the arm 42 ascends or descends with respect to the curved bar 45'. A counter shaft 49 is mounted rotatably on the frame member 1 below the arms 22 and 42 and has a sprocket-wheel 50 thereon which is connected by a sprocket-chain 51 with the sprocket-wheel 48, the counter shaft having also a sprocket-wheel 52 secured thereto which is connected by a sprocket-chain 53 with a sprocket-wheel 54 that is secured to the shaft 40 whereby the motion of the sprocket-wheel 48 is transmitted to the pinion 41. It will be apparent, therefore, that when the wheel 30 is at rest the forward portion of the main frame part will be supported fixedly at the desired height, and when the wheel 30 is operated to readjust the height of the cutting apparatus, the latter will be adjusted uniformly at both ends thereof.

A shaft 55 is mounted rotatably on the frame member 3 and has a crank 56 that is connected by a pitman 57 which is connected to the wrist-pin 11 for operating the knife-bar, the shaft 55 having a bevel gear-wheel 58 secured thereto, which is driven by a bevel gear wheel 59 that is secured to a shaft 60 mounted in the journal-box 24, the shaft 60 preferably extending into the journal-box 25 and having a sprocket-wheel 61 secured thereto to be driven by a sprocket-wheel 62 which is suitably mounted at the outer side of the wheel 33 to be rotated thereby, the sprocket-wheels 62 and 61 being connected by a sprocket-chain 63. Preferably a belt tightener pulley 64 is mounted on the member 1 so as to prevent slack in the chain belt 63.

A conveyer shaft 65 is mounted in the members 1 and 2 and has a roller 66 attached thereto, the shaft being arranged near the frame member 6, and near the member 4 another shaft 67 is mounted rotatably in the members 1 and 2 and has a roller 68 secured thereto, there being a continuous conveyer belt 69 mounted on the rollers 66 and 68, the belts having slats 70 attached thereto, for conveying the cut grain toward the side member 3 to be delivered to an inclined floor 71 from which the grain may be delivered or taken onto a suitable self binder which may be mounted on the machine frame above the member 3. A plurality of thin metallic strips as 72 and 72' extend from the member 4 to the inclined floor 71 and rest on the slats 70 for support to guide the grain stalks from the belt onto the inclined floor. The rearward end of the shaft 65 has a beveled gear wheel 73 secured thereto. A shaft 74 is mounted rotatably on the frame member 2 and has a bevel gear wheel 75 secured thereto that drives the wheel 73, the shaft 74 having also a bevel gear wheel 76 secured thereto that is driven by a bevel gear wheel 77 which is secured to the shaft 55. A sheet metal guard 78 is mounted under the frame members 1 and 2 to protect the conveyer belt from injury by the stubbles. The member 4 has a guide 79 mounted thereon and extending forward and outward above the path of the wheel 38, as is customary.

A pair of posts 80 and 80' are mounted uprightly on the frame members 1 and 2 and have a beam 81 mounted on the tops thereof to constitute a frame in which a shaft 82 is rotatably mounted and having a plurality of cranks as 83, 83', 83'', at different angles, the cranks having feed bars as 84, 84', 84'', connected thereto and extending up through suitable guide openings in the beam 81, the lower ends of the feed bars being adapted to feed or draw the grain stalks from the conveyer belt onto the incline floor 71 and push the grain up on the floor, the shaft 82 having a sprocket-wheel 85 secured thereto for rotating the shaft. A sprocket-wheel 86 is mounted on the frame member 2 and is connected by a sprocket-chain 87 with the sprocket-wheel 85, the sprocket-wheel 86 being driven by a bevel gear wheel 88 that engages a bevel gear wheel 89 which is secured to the shaft 74.

A bench comprises two upright members 90 and 90' mounted on the members 1 and 2 and a beam 91 attached to the tops of the upright members. A seat spring 92 is mounted securely on the top of the bench and has a driver's seat 93 mounted thereon.

The post 80 is provided with an axle 94 on which is rotatably mounted a pillar 95 that has an axle 96 at the upper end thereof, said upper end having a quadrant 97 thereon that has projecting teeth 97'. An arm 98 constituting a beam and lever is mounted pivotally on the axle 96 and is provided with a latch 99 to engage the teeth 97', the latch having an operating handle 99' connected therewith that is arranged within reach of the driver when seated. The arm 98 being pivoted between its ends extends forward a suitable distance and has a journal-box 100 on its forward end in which a shaft 100' is rotatably mounted, the shaft having a flange 101 thereon to which radially arranged arms 102 and 102' are secured and which carry horizontal bars 103 to constitute a reel which operates above the cutting apparatus, the position of the axis of the reel being adjustable vertically by means of the arm 98 and forward or rearward by movement of the pillar 95, the function of the reel being well-known.

A sprocket-wheel 104 is secured to the shaft 100' and is connected by a sprocket-chain 105 with a sprocket-wheel 106 which is mounted rotatably on the axle 96 and is driven by a sprocket-wheel 107 adjacent thereto which in turn is driven by a sprocket-chain 108 that is connected to a sprocket-wheel 109 mounted on the axle 94. A quadrant 110 is mounted on the beam 81 and has spur-teeth 110', a lever 111 being mounted pivotally on the beam preferably by means of the body part of the quadrant, and the lever has a latch 112 mounted thereon within reach of the driver, a coupling-rod 113 being connected to the lever 111 and to the pillar 95, so that the latter is controlled by the lever. A sprocket-wheel 114 is connected to the sprocket-wheel 109 so as to drive the wheel 109 on the axle 94. A counter shaft 115 is mounted rotatably on the frame member 1 and has a sprocket-wheel 116 secured thereto that is connected by a sprocket-chain 117 with the wheel 114, a sprocket-wheel 118 being secured also to the counter shaft 115 and connected by a sprocket-chain 119 that is connected to a sprocket-wheel 120 which is secured to another counter-shaft 121 which is mounted below the counter-shaft 115 on the member 1, the counter-shaft 121 having a sprocket-wheel 122 secured thereto that is connected by a sprocket-chain 123 which is connected with a sprocket-wheel 124 which is secured to a sleeve 125 that is mounted rotatably on the shaft 40 and has a worm gear wheel 126 secured thereto that is in engagement with and is driven by a worm gear wheel 127 which is secured to the shaft 65, so that the reel may be operated in unison with the conveyer and other parts of the machinery.

It should be understood that the axle 32 should be located as close as practicable to the forward end of the main frame part, and also that the side carrying wheel 38 be arranged as closely behind the cutting apparatus as practicable. It will be understood also that any suitable type of self-binder may be mounted on the main frame part to receive the cut grain from the inclined floor 71, and the binder may be driven from a sprocket-wheel 128 that is secured on the shaft 55. The position of the sprocket-wheel, of course, may be shifted along the shaft to any desired point to suit the driving connections of the binder; and various modifications in detail may fairly be made within the scope of the appended claims.

In operation the machine is drawn and guided by means of the pole or tongue 34 which is pivotally connected firmly with the arms 21 and 22 of the frame by means of the main axle 32, so that when the pole swings laterally the machine frame will be moved laterally as about a pivot whose vertical axis may be assumed to pass through the axle of the wheel 33. All the mechanism will be driven by the sprocket-chain 63, as will be understood from the foregoing description of construction, and the cut grain will fall on the conveyer belt by which it will be delivered onto the floor 71 and pushed up over the floor by the feed bars or packers, as 84 hereinbefore described. When it is desired to readjust the cutting apparatus as to height the hand-wheel 30 should be turned, with the result that the guide 35 will be readjusted with respect to the wheel 38 in unison with the movement of the frame member 1 relatively to the arms 21 and 22, the ratios of the gearing being designed to attain the required result. The operation of the wheel 30 does not materially change the height of the frame from the ground at the rear end thereof, and when it is desired to raise or lower the rear end, it will be understood that the shaft 15 should be turned in the proper direction by hand, and after the rear end of the frame is adjusted relatively to the wheel 19 so that the frame will be carried approximately at the desired distance from the ground, the forward end of the frame may be quickly readjusted to suit conditions for raising the cutting apparatus so as to clear obstructions, as on stony ground, or to lower the cutting apparatus on relatively smooth ground so that the grain may be cut as closely as practicable to the ground.

Having thus described the invention, what is claimed as new, is—

1. A reaper including a main frame part for carrying cutting apparatus and having a horizontal pivot rearward of the forward end thereof, a supplemental frame part connected to the pivot and extending forward above and beyond the forward end of the main frame part, an axle mounted in the supplemental frame part, a main wheel on the axle, a toothed quadrant secured rigidly to one of the frame parts, a shaft mounted rotatively on the other one of the frame parts and extending upward, a worm secured to the shaft and engaging the quadrant, and a hand-wheel secured to the upper end of the shaft.

2. A reaper including a main frame part for carrying cutting apparatus and having a horizontal pivot rearward of the forward end thereof, a supplemental frame part connected to the pivot and extending forward above and beyond the forward end of the main frame part, a toothed quadrant secured rigidly to the forward end of the main frame part and curved concentrically to the pivot, a shaft mounted rotatively and uprightly on the supplemental frame part, a worm secured to the shaft and engaging the quadrant, a hand-wheel secured to the upper end of the shaft, a seat mounted on the main frame part rearward of the hand-wheel, an axle mounted in the supplemental frame part, and a main wheel on the axle.

3. A reaper including a main frame part having a horizontal pivot on one side portion thereof, a supplemental frame part connected to the pivot, an axle mounted in the supplemental frame part, a main wheel on the axle, a toothed quadrant secured to one of the frame parts remote from the pivot, a lock device mounted movably on the other frame part and normally engaging the quadrant, a trailing wheel supporting the rear end of the side portion of the main frame part, a vertical guide on the opposite side portion of the main frame part, an axle-head mounted adjustably on the guide and having gear teeth thereon, a carrying wheel on the axle-head, an operating shaft mounted rotatably on the main frame part, a pinion secured to the shaft and engaging the gear teeth, a curved rack-bar on the supplemental frame part, an arm rigid on the main frame part, a pinion rotative on the arm in contact with the rack-bar and provided with a transmission shaft to which it is operatively connected, and gearing connections between the transmission shaft and the operating shaft.

4. A reaper including a main frame part having a horizontal pivot, a supplemental frame part connected to the pivot, an axle mounted in the supplemental frame part, a main wheel on the axle, a pole or tongue connected to the supplemental frame part, a toothed quadrant secured to one of the frame parts, a lock device mounted movably on the other frame part and normally engaging the quadrant, a carrying wheel supporting one side of the main frame adjustably, a vertical guide secured to the rear end portion of the other side of the main frame part, a pivot-head mounted adjustably on the guide and having gear-teeth thereon, a wheel-frame pivotally connected to the pivot-head, a trailing-wheel mounted in the wheel-frame, a shaft mounted rotatably on the main frame part and having a toothed wheel secured thereto that engages the gear-teeth of the pivot-head, a lock-bolt mounted movably in the main frame part and normally engaging the toothed wheel, and cutting apparatus mounted on the main frame part.

5. A reaper including a main frame part having a horizontal pivot and provided with a toothed quadrant remote from the pivot, a supplemental frame part connected to the pivot and having journal-bearings thereon, an operating-shaft mounted in the journal-bearings and having a worm thereon that engages the quadrant, a hand-wheel secured to the operating-shaft, an axle mounted in the supplemental frame part, a main or drive wheel on the axle, a trailing wheel supporting the rear end of the main frame part, a carrying wheel supporting one side of the main frame part adjustably, a seat-bench on the main frame part adjacent to the operating shaft, a sprocket-wheel rotatable about the axis of the horizontal pivot and having a drive shaft connected therewith to be rotated thereby, a main sprocket-wheel connected to the main or drive wheel, and a sprocket-chain connecting the sprocket-wheel with the main sprocket-wheel.

6. A reaper including a main frame part having two horizontal journal-boxes mounted on one side portion thereof, a pivotal shaft mounted rotatively in the journal-boxes and having a sprocket-wheel secured thereto, a supplemental frame part pivotally connected with the two journal-boxes, said supplemental frame part having journal-bearings thereon, an approximately upright operating shaft mounted in the journal-bearings and having a worm secured thereto, a toothed quadrant secured to the main frame part and engaging the worm, a hand-wheel secured to the operating shaft, an axle mounted in the supplemental frame part, a main driving wheel on the axle, a main sprocket-wheel connected to the main driving wheel, a sprocket-chain connecting the main sprocket-wheel with the sprocket wheel on the pivotal shaft, a pole or tongue connected with the supplemental frame part, a trailing wheel supporting the rear end of the side portion of the main frame part, and a carrying wheel adjustably supporting the other side portion of the main frame part.

7. In a reaper, the combination of a main frame part having a horizontal pivot on one side portion thereof, a supplemental frame part connected to the pivot and having a curved rack-bar thereon, means for adjustably securing the supplemental frame-part to the main frame part remote from the horizontal pivot, a main wheel supporting the supplemental frame part, a trailing wheel partially supporting the side portion of the main frame part, an axle head mounted adjustably on the opposite side portion of the main frame part, a carrying wheel on the axle head, a shaft mounted rotatively on the main frame part and connected with the axle head for adjustment thereof, a sprocket-wheel secured to the shaft, an arm rigid on the main frame part and extending adjacent to the rack-bar and having a gear-wheel thereon engaging the rack-bar, a sprocket-wheel on the arm connected with the gear-wheel to be operated thereby, and drive-chain connections between the said two sprocket-wheels.

In testimony whereof, I affix my signature in presence of two witnesses.

VORA McLAUGHLIN.

Witnesses:
FLAVIUS J. BOOKER,
WALTER E. STANLEY.